3,066,074
EXTRACT OF BIXA ORELLANA PLANT FOR USE AS A PHARMACEUTICAL
Harold G. Hartgerink, 1294 Beach Drive, Holland, Mich.
No Drawing. Filed May 7, 1959, Ser. No. 811,530
2 Claims. (Cl. 167—65)

The present invention relates to a new pharmaceutical composition and to a process of obtaining the same. More particularly, the present invention relates to a pharmaceutical composition capable of producing certain physiological responses.

This invention results from a study of the *Bixa orellana* plant, and the discovery that certain portions of this plant, namely, the root and particularly the root bark, contain certain principles which exhibit physiological reactions. On the basis of this discovery, it became an object to isolate certain principles, and this led to the discovery that certain extracts of the root exhibit desirable and valuable physiological reactions.

The plant known as *Bixa orellana* is a member of the group of trees and shrubs referred to as Bixaceae, and is found in Central and South American countries. This plant, which is called by the common names achiote, and achoate, has been used as a source of annatto or bixin, a dye stuff having a red or yellowish-red color, which is obtained from the pulp surrounding the seeds of the plant. So far as it is known, however, there has been no attempt to extract either chemical or pharmaceutical products from the root or bark of the root.

The present invention concerns the roots and root bark of the *Bixa orellana* plant. I have discovered that the ground root and extracts of the root and the root bark of this plant have distinct and valuable physiological characteristics useful in the regulation and treatment of certain animal conditions. It is believed that the roots of the *Bixa orellana* plant have heretofore been entirely overlooked as a source of compositions capable of use for chemical or for pharmaceutical purposes. The present invention contemplates the extraction of certain active ingredients from the roots of the *Bixa orellana* plant, as well as the use of the ground whole root. Preferably the root bark is used in the process for the reason that it appears to yield extracts up to five or more times as active as extracts from the whole root. However, either the root or bark or combination of both may be employed.

To illustrate my invention, the active principles of the *Bixa orellana* root are obtained by the following procedure, and the use and testing of these principles in animals and on animal tissues will be described. The roots of the plant are obtained, washed and ground to a powder. This powder itself exhibits certain physiological properties as will later appear. For other uses, it is desirable to isolate certain active principles of the root. To this end, an extract of the root or root bark or both is prepared.

To prepare a root extract, 100 grams of ground whole root is placed in a Soxhlet extractor with a suitable amount of petroleum benzin. The extraction is carried out over a period of about ten to twelve hours and is effective in removing fats and oils contained within the root. The extraction is repeated with ethyl ether as a solvent for the further removal of fats, and again this extraction is carried out over a period of about ten to twelve hours. Both the petroleum benzin and ether solvents are discarded, these solvents containing undesired dissolved fats, oils and coloring materials.

Using the same Soxhlet extractor with the previously washed extract (with ether and petroleum benzin), it is now treated with a suitable quantity of 95% pure ethyl alcohol and extracted over a period of about twelve hours. This extraction has been found to remove almost all of the active fractions of the root that are soluble in alcohol, although an additional six to twelve hours has been found to increase the yield slightly. This alcohol solution is evaporated at room temperature and in the absence of heat; to assist in the evaporation a partial vacuum can be effectively employed. The use of high heat here destroys the activity of the fraction although a very moderate amount of heat does facilitate the rate of evaporation. At first a sticky substance remains, this being so after the alcohol is gone but the 5% water remaining. Upon further drying, a brownish-red residue in a cake form remains and this is easily crumbled to a powder. The color of the residue varies somewhat with the age and country-source of the root. This fraction will be hereafter known as Extract A, being the alcohol extract. Other monohydroxyl alcohols and infinite combinations of alcohol and water are suitable for extraction purposes as well as weak polar solutions in combinations with alcohol and/or water, or both.

A second extract, hereinafter referred to as Extract B, is obtained by repeating the above extraction procedure using the same Soxhlet and the same ground root material, but instead of alcohol, distilled water is employed. Extraction time here is the same as with the alcohol extraction but the drying time is greater. The residue here is less red in color, this varying again with the source of the root.

The water fraction (Extract B) when dried is observed to closely resemble the alcohol fraction. These two powders, Extract A and Extract B, solubilized in distilled water, are used in the tests which follow. As will be observed from the results in the following tests, Extract A and Extract B exhibit somewhat different characteristics. It is believed that each may be a combination of more than one active principle, although identification of any one principle has not as yet been accomplished.

Observations to date indicate that five to six distinctive reactions can be noted on laboratory animals when using the extracts or the pulverized whole roots of the plant, some of these reactions being in vitro and some in vivo: (1) Extract B is spasmogenic; (2) Extract A is antispasmodic; (3) pulverized whole roots exhibit an antisecretory action as determined from a Shay-rat test; (4) both of the extracts exhibit hypotensive action in I.V. feeding; (5) an effect of lowering of the shock threshold to electro-shock seizures, similar to reserpine; and (6) a tranquilizing action with no apparent lessening of the voluntary control. The following paragraphs illustrate these reactions:

I

Extracts A and B were employed in in vitro tests with the ileum of albino male rats, this being a recognized method for testing isolated organs. In this method, 100 mg. of Extract B in 35 cc. of distilled water was employed, and an increased tonus was observed. Extract B was thus found to be spasmogenic. In similar tests with Extract A the tonus was decreased and this extract was thus observed to be spasmolytic. These in vitro tests covered work with the ileum from twenty rats as well as rabbit and guinea-pig tissue.

II

In an in vivo test, referred to in the art as the Macht and Barba-Gose test, twenty-four albino rats were used and were fed a suspension of charcoal. As a control, a suspension of charcoal alone was employed. In the control after about twenty minutes it was noted upon opening the rats that the charcoal had moved about one-third of the way down the small intestine. In a second group of animals a suspension of Extract B, in the ratio of one gram of Extract B per kg. of body weight was administered orally. After sixty minutes, charcoal as in the control, was administered. When the animal was opened and its small intestine inspected and measured, it was noted that a distinct increase in movement was present as compared with the control. A repeat of this procedure using Extract A in the same ratio as Extract B inhibited the tonus to the extent that the charcoal never left the stomach. In each instance animal weights, quantities used, and the time involved were substantially constant.

III

Antisecretory tests known as the Shay-rat test were undertaken on thirty-eight albino rats, both male and female. A 2% methyl-cellulose suspension of 50 mg. per cc. of powdered whole root was injected intra-duodenally. Doses of 400 mg. per kg. of body weight were observed to inhibit the volume of secretion from the intestine an amount slightly in excess of 50% as compared to a control. Doses of 1 gram per kg. of body weight showed a secretory inhibition in excess of 81%.

Subsequent antisecretory tests using combined Extracts A and B showed identical results but with very much smaller doses. In this latter instance, for example, doses used were 20 and 30 mg. In the tests with the extracts the same type of animals were used with feedings and times corresponding to the whole root procedure as described above.

IV

Hypotensive tests were run, using intravenous injections, with two groups of four full grown cats each, and three six-month old kittens. In the first test, grown cats, averaging 4.5 kilograms in weight, were anesthetized with nembutal urethane. A 100 mg. per cc. solution of Extract B in water was employed. With an initial blood pressure observed at 180, a 1 cc. injection reduced the blood pressure to 160 at once and held it there. After five minutes, a 3 cc. injection of the same dilution dropped the blood pressure to 70. Two animals were rescued from possible death with prompt injections of epinephrine.

These tests were repeated with a solution of Extract A having a dilution of 25 mg. per cc. It was observed that a 2 cc. injection of the Extract A solution dropped the blood pressure from 180 to 85 in six minutes, but recovery with epinephrine was not needed.

A solution of Extract B in a dilution of 50 mg. per cc. was employed with a group of kittens averaging .910 kilogram in weight. A 2 cc. injection dropped the blood pressure from 130 to 110 immediately. After twenty minutes, an injection of 4 cc. dropped it from 110 down to 60. Epinephrine, injected intravenously brought the blood pressure back to 105 in less than one minute with subsequent recovery. Figures mentioned in the preceding paragraphs on blood pressure are averages covering the animals concerned.

V

The lowering of the electroshock threshold in albino rats was observed by force feeding them with a methyl-cellulose suspension of pulverized whole root of the *Bixa orellana* plant. Following the procedure of waiting thirty minutes, and in some cases forty-five minutes, after the force-feeding, the animals were subjected to an electroshock treatment with electrodes placed on their corneas. Comparing the force-fed animals with controls, a lowering of the electroshock threshold was clearly indicated in the case of those animals fed the root.

VI

Dosages of amounts between 10 milligrams per kilogram of body weight to 3500 milligrams per kilogram of body weight of Extracts A and B, prepared as described in Example I, were administered intraperitoneally to albino rats. A tranquilizing effect was observed of reducing spontaneous (or voluntary) activity, as measured in a photoelectric cell cage. However, it was further observed that the same doses did not diminish forced (or involuntary) activity as measured by a treadmill apparatus. This distinction is a most desirable one for any tranquilizing action. The photoelectric cell cage and the treadmill apparatus are two newly designed devices known in the art and especially constructed to measure and evaluate tranquilizing action. It might be pointed out here that known tranquilizers such as the barbiturates reduce the voluntary activity, but they also reduce the ability to respond to forced activity.

The extracts of this invention lowered the spontaneous activity at a rate comparable to known tranquilizers, and have the further extremely desirable property of not diminishing the forced activity. The extracts have also been found to be safe for use, requiring the extremely large dose of over 4000 mg. per kilogram of body weight to produce death in the subject animal.

I claim as my invention:

1. The process of preparing a dried extract which comprises removing naturally occurring color, fat and oil from a member selected from the group consisting of *Bixa orellana* whole root and root bark in a water-immiscible organic solvent, separating the solvent-insoluble residue, extracting said residue with a second solvent selected from the group consisting of water, lower-monohydroxy alcohols, one molar acetic acid, and mixtures thereof, separating the second solvent-soluble extract and drying the separated extract.

2. A dried extract of *Bixa orellana* prepared according to the process of claim 1.

References Cited in the file of this patent

Kraemer: Botany and Pharmacognosy, 2nd Ed., p. 338, 1907.
Heidushka et al.: Beriche, 50, pp. 546–554, 1917.
Mell: Textile Colorist, vol. 51, pp. 401–402 (1929).
Cook et al.: Science, 75, p. 85, 1932.